Oct. 9, 1962 R. G. AGUTTER ET AL 3,057,376

STACKED PLATE TYPE FLUID OPERATED VALVE

Filed May 3, 1960 2 Sheets-Sheet 1

INVENTORS
RONALD GRAHAM AGUTTER
BRIAN JOHN PARKES

BY Morgan, Finnegan, Durham & Pine
ATTORNEYS

STACKED PLATE TYPE FLUID OPERATED VALVE

Filed May 3, 1960 2 Sheets-Sheet 2

INVENTORS
RONALD GRAHAM AGUTTER
BRIAN JOHN PARKES
BY Morgan, Finnegan, Durham & Pine
ATTORNEYS United States Patent Office 3,057,376

Patented Oct. 9, 1962

3,057,376
STACKED PLATE TYPE FLUID OPERATED VALVE

Ronald Graham Agutter and Brian John Parkes, Rochester, England, assignors to The British Petroleum Company Limited, London, England, a joint-stock corporation of Great Britain Filed May 3, 1960, Ser. No. 26,482
4 Claims. (Cl. 137—594)

This invention relates to a novel fluid operated valve.

According to the invention there is provided a valve comprising a stack of plates, said stack comprising, in the following order, (*a*) a flexible plate, (*b*) a plate, hereinafter referred to as the "transfer plate," having at least one port therethrough and (*c*) a plate, hereinafter referred to as the "ported plate," having at least two ports which are located to be in communication with the port of the transfer plate, said flexible plate, under the action of fluid pressure, being capable of sealing off the said ports of the ported plate.

Preferably the stack also comprises a manifold plate having at least one port located to enable fluid pressure to be applied to the flexible plate, said manifold plate being positioned in the stack next to the flexible plate, on the side thereof remote from the transfer plate.

If desired the transfer plate may be provided with two or more ports, each port being in association with a set of two or more ports in the ported plate, whereby, on closure of the ports in the ported plate by means of the flexible plate, two or more sets of ports in the ported plate may be simultaneously sealed off.

In certain circumstances it may be desirable to introduce fluid, to be controlled by the valve, and fluid, to control the action of the flexible plate from the same side of the valve.

According to a further feature of this invention there is provided a valve comprising a stack of plates, said stack comprising, in the following order (*a*) a flexible plate, (*b*) a transfer plate, as hereinbefore described, (*c*) a ported plate, as hereinbefore described, and (*d*) a plate, hereinafter referred to as the "labyrinth plate" having at least one passageway providing communication between a port of said ported plate, said ported plate being capable of being sealed by the flexible plate and a series of further ports, at least one port of said series being provided in each of the other plates of the stack in intercommunication.

According to a further feature of this invention there is provided a valve comprising a stack of plates, said stack comprising, in the following order, (*a*) a flexible plate, (*b*) a transfer plate as hereinbefore described, (*c*) a ported plate, as hereinbefore described, and (*d*) a plate, hereinafter referred to as the "labyrinth plate" having at least one passageway providing communication between a port of the ported plate of one set of ports, as hereinbefore described, with a port in the ported plate of a different set of ports. In use fluid, subject to control by the valve, may be routed through a storage cavity constituted by the "dead space" sealed off within the hole of the labyrinth.

According to a further aspect of this invention, two valves as hereinbefore described, may be incorporated into a single stack of plates.

According to a further aspect of this invention, two valves as hereinbefore described may be incorporated into a single stack, having a single labyrinth plate serving both valves, whereby one or more streams of fluid, to be subject to control, are routed through both valves.

Preferably the plates employed in the construction of the valve of this invention are thin rectilinear plates. The ports provided in the plates may be of any form; ports, which, in association, provide a throughway will usually be circular holes to constitute a passageway of circular cross-section; and ports which provide for lateral communication may be in the form of slots. Passageways may take any convenient form, as, for example slots, or grooves or holes.

The flexible plates are preferably constructed of synthetic rubber or flexible metal sheet.

The transfer, ported, manifold and labyrinth plates are rigid plates which may be constructed of metal, asbestos, or synthetic resins, for example, polytetrafluorethylene or polymethylmethacrylate. Gaskets may be provided between adjacent rigid plates.

The plates may be held together by means of bolts, passed longitudinally through the assembly, or by means of an external clamp.

The control fluid may be liquid or gaseous; usually air will be suitable. It will generally be necessary for the control fluid to be employed at a pressure in excess of the maximum pressure which is to be experienced in the fluid which is to be controlled by the valve.

A valve constructed in accordance with the present invention is particularly suitable for use in analytical procedures which require the rapid switching or re-routing of gas streams, for example gas chromatography. A valve according to this invention is particularly suitable for use in gas chromatography to provide a means of rapidly and easily introducing a gaseous sample into a gas stream. A valve suitable for this purpose is described in detail hereinafter. The invention is illustrated but not limited with reference to the accompanying FIGURES 1–3, in which.

Figure 1:
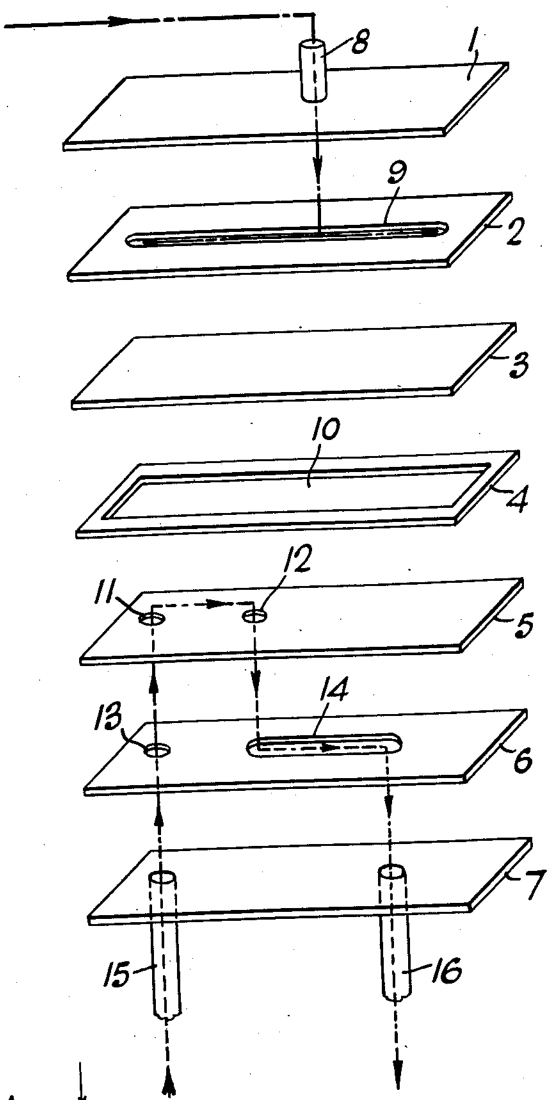
FIGURE 1 is an exploded view showing, schematically, the plate stack required for a simple valve unit.
Figure 1A:
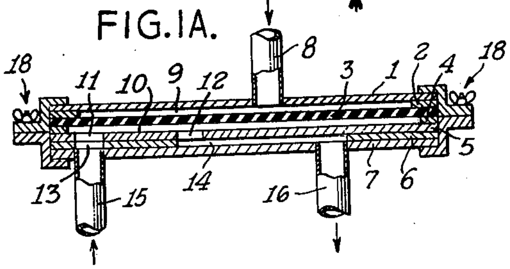
FIGURE 1A is a sectional elevation of the valve unit of FIGURE 1 with the plate stack arranged for use.

With reference to FIGURE 1 and FIG. 1A, the valve is made up, essentially, of a plate stack consisting of a back plate 1, an air manifold plate 2, a flexible plate 3, transfer plate 4, ported plate 5, labyrinth plate 6 and base plate 7. The plate stack comprising the valve is suitably held in assembled relation by means of external clamps 18.

Backing plate 1 is provided with a tube 8 by means of which operating air is introduced to the stack. The air manifold plate is provided with a longitudinal slot 9 by which air pressure is applied evenly to the upper surface of flexible plate 3. The space in plate 4 has a large rectangular port 10 through which the flexible plate 3 is distorted under air pressure, to seal off ports 11 and 12 in ported plate 5. Labyrinth plate 6 is provided with a port 13, which is in communication with port 11, and a slot 14, which communicates with port 12. The base plate 7 carries tubes 15 and 16 which register respectively with port 13 and slot 14 and which provide a means of ingress and egress of the fluid undergoing control.

In operation, without the application of air pressure by tube 8, fluid undergoing control will be permitted to pass from tube 15 to tube 16 via ports 13, 11, 12 and slot 14. When air pressure is applied at tube 8, ports 11 and 12 are sealed by flexible plate 3, thereby closing the valve.

For the interruption of only a single fluid stream, as illustrated in FIGURE 1, and FIG. 1A the air manifold and fluid manifold plates are superfluous but are included in the figure in order to illustrate how interconnections may be provided, where necessary, when the valve is employed in a more complex system.

Figure 2:
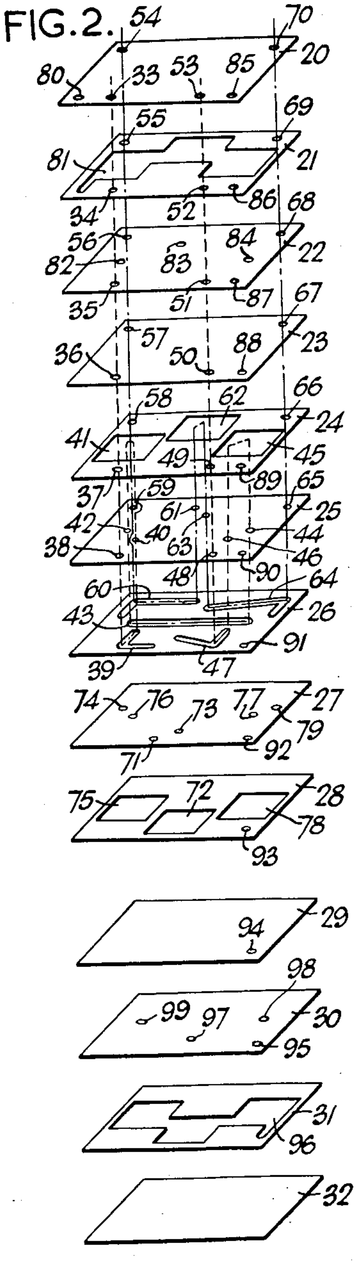
FIGURES 2 and 3 are exploded views showing, schematically, the plate stack of a compound valve in different operating positions.
Figure 3:
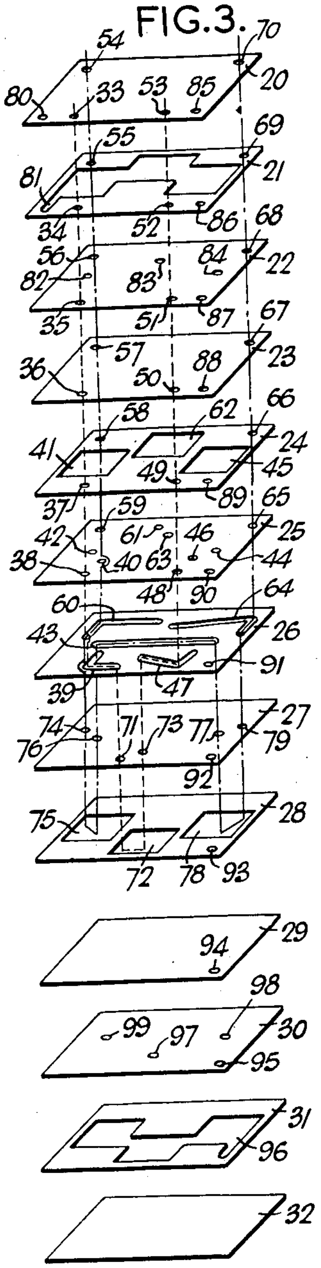

The valve illustrated in FIGURES 2 and 3 is particularly suitable for use in gas chromatography for the purpose of introducing a sample of known volume into a stream of gas. Usually, this operation has been performed by means of six separate valves; by the use of apparatus according to the present invention these six valves are replaced by a single unit and, furthermore, the dead space, which normally exists between separate valves of a valve system, is materially reduced.

With reference to FIGURES 2 and 3 the plate stack consists of a top plate 20, an air manifold plate 21, support plate 22, flexible plate 23, transfer plate 24, ported plate 25, labyrinth plate 26, ported plate 27, transfer plate 28, flexible plate 29, support plate 30, air manifold plate 31 and base plate 32. The plate stack of this embodiment may also be suitably held in assembled relation by means of external clamps.

The valve provides for the simultaneous passage of two streams of fluid; the dotted line indicates the route taken by sample gas and the dash and dotted line illustrates the path taken by eluent gas.

In FIGURE 2 the valve is depicted with air pressure applied to the lower flexible plate, that is plate 29, and in FIGURE 3 the valve is shown with air pressure supplied to the upper flexible plate, that is plate 23.

With reference to FIGURE 2:

Sample gas enters continuously by hole 33 and passes downwards by ports 34–38 inclusive to the L-shaped slot 39 of plate 26, thence passing by port 40 into the rectangular port 41 of plate 24. Port 41 provides for inter-communication between ports 40 and 42 of plate 25 and thus the sample continues downwards by way of port 42 into slot 43 of plate 26 and thence by ports 44, 45 and 46 into L-shaped slot 47 of plate 26, thence escaping by ports 48—53.

Eluent gas enters continuously by port 54 in plate 20 and passes by ports 55—59 into L-shaped slot 60 of plate 26 and thence by ports 61—63 to L-shaped slot 64, finally escaping by ports 65—70.

In operation, after all passageways have been purged by flow of the sample gas and eluent gas, air pressure is applied to flexible plate 23, thereby closing off ports 40, 42, 44, 61 and 63.

The air pressure on flexible plate 29 is now relieved, thereby opening the lower valve. In consequence, the sample gas is now routed to flow through ports 33–38 inclusive, slot 39, holes 71, 72, 73, slot 47 and ports 48—53 and eluent gas is now routed to flow through ports 54—59, slot 60, ports 74—76, slots 43, ports 77, 78 and 79, slot 64 and ports 65—70.

In consequence of the rerouting of the sample gas and eluent gas, eluent gas is caused to pass through slot 43 which is filled with sample gas, thereby introducing a known volume of the sample gas into the eluent gas stream.

The upper flexible plate 23 is operated by means of air introduced by port 80 in plate 20 into the aperture 81 in plate 21, pressure being applied to the upper side of plate 23 by way of ports 82, 83 and 84.

Similarly, air pressure is provided for flexible plate 29 by introducing air at port 85 in plate 20. Air thence passed by ports 86—95 into the aperture 96 of plate 31, reaching the lower side of plate 29 by way of ports 97, 98 and 99 in plate 30.

Suitably, plates 20, 22, 25, 27, 30 and 32 are made of metal and plates 21, 23, 24, 26, 28, 29 and 31 are made of neoprene.

We claim:

1. A valve, comprising a stack of plates, means for securing said stack of plates in assembled relation, said stack including, in the following order, (*a*) a first flexible plate, (*b*) a first transfer plate having at least one port formed therethrough, the lower surface of the first flexible plate in the relaxed position being flush with the upper surface of the first transfer plate, (*c*) a first ported plate having at least three ports, at least two of said three ports communicating with the port of the first transfer plate, said first flexible plate under the action of fluid pressure being capable of distortion through the port of the transfer plate to seal off the two ports of the first ported plate, (*d*) a labyrinth plate having at least two passageways formed therein, (e) a second ported plate having at least three ports formed therein, (*f*) a second transfer plate having at least one port formed therethrough, at least two of said three ports of said second ported plate communicating with the port of said second transfer plate, one passageway of said labyrinth plate leading from one of the two ports of the first ported plate to the third port of the second ported plate, another passageway of the labyrinth plate leading from one of the two ports of the second ported plate to the third port of the first ported plate, and (*g*) a second flexible plate, the upper surface of the second flexible plate in the relaxed position being flush with the lower surface of the second transfer plate, the second flexible plate under the action of fluid pressure being capable of distortion through the port of the second transfer plate to seal off the two ports of the second ported plate.

2. A valve of the character described in claim 1, wherein the plates are thin substantially rectilinear plates.

3. A valve, comprising a stack of plates, means for securing said stack of plates in assembled relation, said stack including, (*a*) a backing plate having at least one orifice formed therein, (*b*) a flexible plate, (*c*) a manifold plate having a pressure transmitting opening communicating with said orifice in said backing plate and said flexible plate, whereby fluid pressure applied through said opening is distributed against said flexible plate, (*d*) a transfer plate having at least one port therethrough, the lower surface of said flexible plate in the relaxed position being flush with the upper surface of the transfer plate, (*e*) a first ported plate having at least two ports communicating with the port of said transfer plate, said flexible plate under the action of fluid pressure admitted through said orifice in said backing plate and applied against said flexible plate through said pressure transmitting opening being capable of distortion through the port of the transfer plate to seal off the ports of the ported plate, (*f*) a labyrinth plate having a passageway formed therein, and (*g*) a second ported plate having at least one port therethrough, said passageway of said labyrinth plate communicating with the port of the first ported plate and with at least one port of the second ported plate.

4. A valve of the character described in claim 3, wherein said plates are thin substantially rectilinear plates.

References Cited in the file of this patent

UNITED STATES PATENTS

| | | |
|---|---|---|
| 2,677,390 | Davis | May 4, 1954 |
| 2,807,280 | Kittredge | Sept. 24, 1957 |
| 2,947,320 | Oxley et al. | Aug. 2, 1961 |

UNITED STATES PATENT OFFICE

CERTIFICATE OF CORRECTION

October 9, 1962

Patent No. 3,057,376

Ronald Graham Agutter et al.

It is hereby certified that error appears in the above numbered patent requiring correction and that the said Letters Patent should read as corrected below.

Column 3, line 47, for "slots 43" read -- slot 43 --; line 65, for "neoprene" read -- Neoprene --.

Signed and sealed this 2nd day of April 1963.

(SEAL)
Attest:

ESTON G. JOHNSON

Attesting Officer

DAVID L. LADD

Commissioner of Patents